United States Patent [19]

Lewis

[11] 4,387,402

[45] Jun. 7, 1983

[54] CHARGE INJECTION IMAGING DEVICE FOR FAITHFUL (DYNAMIC) SCENE REPRESENTATION

[75] Inventor: Adam J. Lewis, Richardson, Tex.

[73] Assignee: Texas Instruments Incorporated, Dallas, Tex.

[21] Appl. No.: 201,643

[22] Filed: Oct. 28, 1980

[51] Int. Cl.³ ............................................. H04N 3/14
[52] U.S. Cl. .................................... 358/213; 358/163
[58] Field of Search ................................ 358/213, 163

[56] References Cited

U.S. PATENT DOCUMENTS

| | | | |
|---|---|---|---|
| 4,155,006 | 5/1979 | Sato et al. | 358/213 |
| 4,293,877 | 10/1981 | Tsunekawa et al. | 358/213 |
| 4,300,163 | 11/1981 | Wada et al. | 358/163 |

Primary Examiner—Richard Murray
Attorney, Agent, or Firm—Robert Groover, III; Melvin Sharp; James T. Comfort

[57] ABSTRACT

A charge injection device array is fabricated, having one row of devices optically opaqued. Device outputs are read using a correlated double sample technique. The voltage of an entire column of devices with a selected row addressed is measured. The same column of devices is again measured with signal of no row addressed. Therefore, the difference is the charge on the device in the row addressed. The output of each device in a column is referenced to the output of the device in the opaqued row of the column, or a set level, if no row is addressed.

4 Claims, 5 Drawing Figures

CHARGE INJECTION IMAGING DEVICE FOR FAITHFUL (DYNAMIC) SCENE REPRESENTATION

BACKGROUND OF THE INVENTION

This invention relates to charge-injection devices, and more specifically to charge-injection device arrays for image sensing.

Presently, large area-high resolution charge-injection device (CID) arrays are fabricated for image sensing applications. The charge injection devices which make up these arrays are basically metal-insulator-semiconductor (MIS) diodes biased to produce a depletion well at the surface of the device. Semi-transparent (thin) metal electrodes are used so that radiation may pass through the electrodes and into the semiconductor where the radiation is absorbed by band-to-band excitation and produces minority carriers which are collected and stored in the potential well.

The CID array is constructed so that the row electrodes of the devices in a row are connected to a common point and that the column electrodes of the devices in a column are connected to a common point. To read the charge collected in a device, a potential is applied to the row electrode of the selected device. The output voltage of the column in which the device is located is then clamped to a set level. An injection pulse is then applied to the column output line, and the charge on each device in the column, except for that of the device in the row addressed, is transferred to the row well. The charge in the column well of the addressed device is injected into the substrate by the injection pulse. The change in voltage on the column output after the injection pulse has passed is the signal assigned to the addressed device.

Such an array is described by Burke and Michon in IEEE Transactions on Electron Devices, Vol. ED-23, no. 1, February 1976, and discusses the operation and performance of CID arrays. The current method of fabrication and information retrieval from CID arrays yields real-time image data, but problems do exist for this application. One problem is that the column outputs in an array may have different dc levels. This is due primarily to time constant effects in the array, and the recovery from the injection pulse which saturates the pre-amp and amplifier circuits. Thermal drift may also cause varying column outputs.

Another problem is that of "blackening" or non-charged devices appearing to be black when in a column with charged devices. This problem occurs because the charge on the output line is changing between the clamp and sample of the read operation, due to the continuing charge integration in the non-addressed device. Anagnostospoulos, in IEEE Transactions on Electron Devices, Vol. ED-25, No. 1, February 1978, attempts a solution to the problem of blackening, which he refers to as "cross-talk". His solution involves special circuitry on the column output lines which drastically reduces the sensitivity of the device.

It is an object of the present invention to provide a CID array which is fabricated with the goal of providing solutions to the problems of blackening and column output level variations. It is also an object of the invention to provide a new technique for information retrieval from the new CID array, as part of the solution to the previously stated problems.

DETAILED DESCRIPTION OF THE INVENTION

In accordance with the invention, a charge-injection device imaging array is fabricated having one row of devices optically opaqued so that radiated energy is not able to reach them or a "phantom" row of devices wherein no devices exist, but the row is read normally, to provide a set level against which other devices in the column may be referenced. The opaquing of a row of devices selected is accomplished in the step following the formation of the row electrodes which are a thin layer of metal, such as nickel, of approximately 100 A. A much thicker layer of a metal, such as aluminum, of approximately 1000 A is deposited over the selected row of devices to be opaqued. Radiated energy does not penetrate the thicker aluminum, while the more thin layer of nickel is penetrated by approximately 25% of the radiation incident upon it. This "blinding" of a row of devices prevents charge from being accumulated due to external sources. The common point connecting the device electrodes on the "blinded" row is held at the same voltage as the substrate on which the array is fabricated. In this way, no row storage well is available in any device in this row, and any possible charge that may leak into the column storage well of any device in this row is injected into the substrate each time a device in the column is read. This aspect of the invention provides a reference for an individual column composed of all operative devices in that column. If no row is opaqued, the phantom row is read to provide a reference level.

Another aspect of the invention is a circuit in the amplifier which clamps the column output to the signal level generated when the opaqued row is read. This circuit is activated once, when the output of the opaqued row is present at the output of the clamp-sample and hold output. This puts each device output reference at the same level.

A charge-injection device imaging array converts radiated energy in the visible or infrared spectrum to electrical signals. The type of semiconductor material used as the substrate determines which wavelength of energy will be responded to by the CID array. Some semiconductor materials respond better to wavelengths in the visible light range, such as silicon, while infrared frequencies have a much better response in other semiconductor materials, such as MgCdTe. The rays entering the semiconductor material are absorbed by the band-to-band excitation, producing minority carriers. These carriers are stored in the depletion well created by the biasing of the charge-injection devices, which are basically MIS (metal-insulator-semiconductor) diodes. The number of carriers produced and stored in a device is determined by the energy level incident upon any single device.

The devices in an array are connected in rows and columns. The construction of the array is accomplished in such a manner as to have row electrodes serve as address lines, and to have column electrodes serve as output data lines.

The reading of data on the column output lines is done by a clamp-sample-hold (CSH) type circuit in conjunction with an addressing logic circuit. After a row has been addressed, the column output is clamped by the CSH circuit. The injection pulse is then coupled to the column output line. This pulse causes the charge in the column wells to be transferred to the row wells in the devices not addressed. For the device which is addressed, a row well does not exist, so the charge is injected into the substrate. When the injection pulse has passed, the charge in each device returns to an equilibrium between the row well and column well. Only the row that is addressed has no charge in the column well. The column output is sampled, and the amplified sample placed on the signal output line. Each device in the column is read, and the resulting train of data signals is coupled to a processing circuit before going to a display or other use.

DETAILED DESCRIPTION OF THE DRAWINGS

Figure 1:
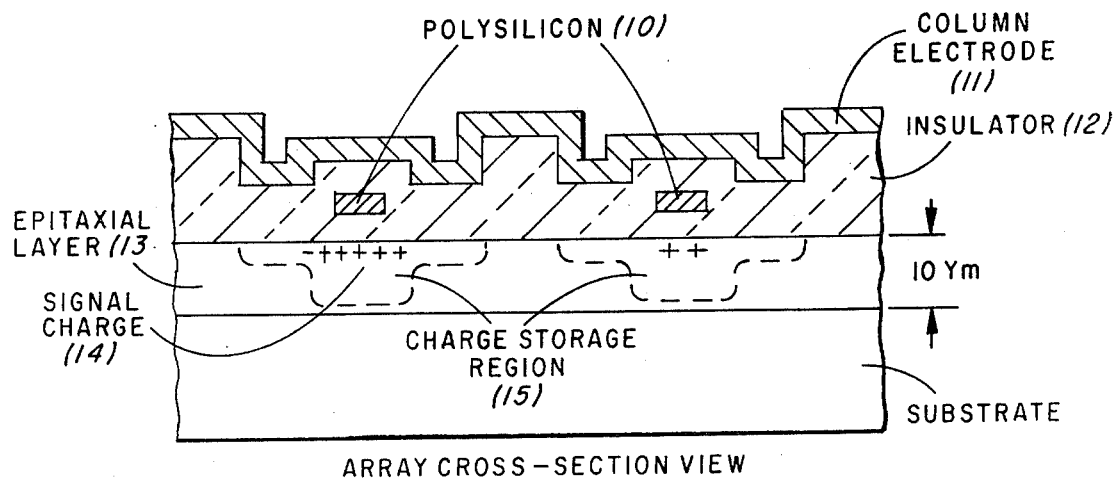
FIG. 1 is a cross section view of a CID array.

In FIG. 1, construction of a CID array is shown in a cross-sectional view. Polysilicon row electrodes 10 are embedded in an insulator 12 over an epitaxial layer of N-type material 13. The P-type silicon substrate 16 receives the stored charge when the injection pulse is coupled to the column electrode 11. When the column electrode 11 and row electrode 10 are properly biased, a depletion region is formed in the N-type material 13, effectively creating a charge storage well 15.

Figure 2:
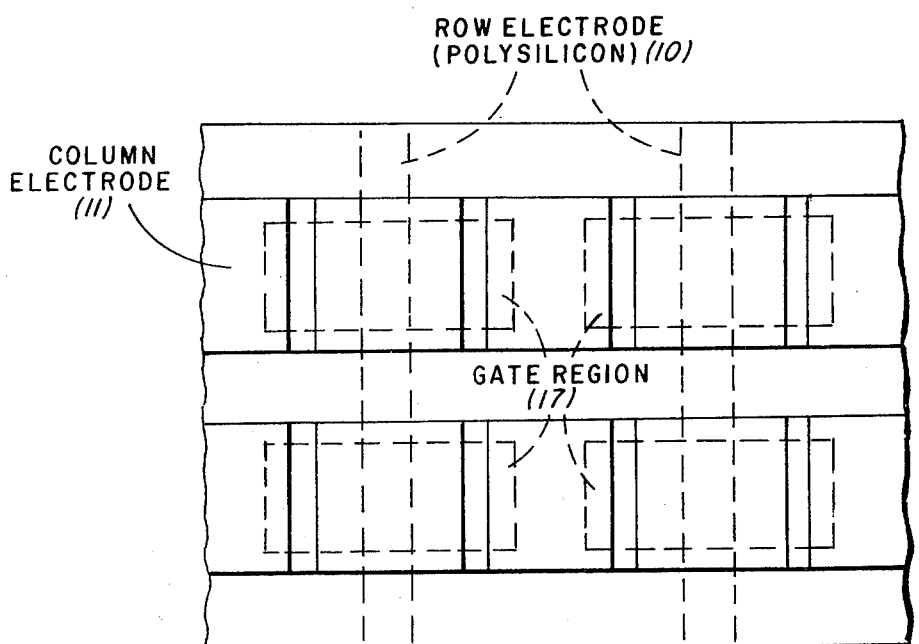
FIG. 2 is a top view of a CID array.

FIG. 2 illustrates an intersection of a row electrode 10 and column electrode 11 and formation of a gate region 17. Radiated energy is absorbed in the N-type epitaxial layer 13 to produce minority carriers that migrate through the layer to the charge storage region 15.

Figure 3:
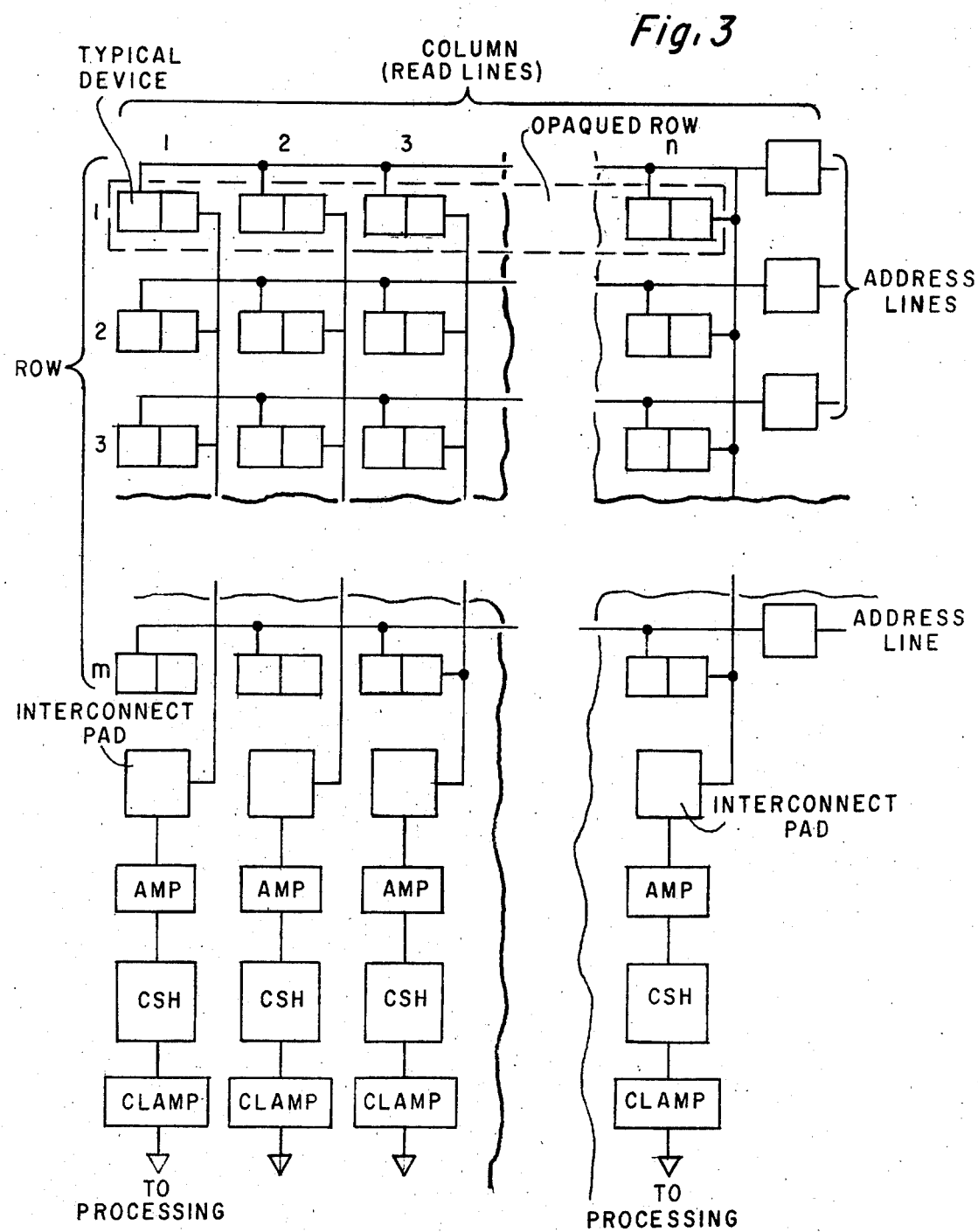
FIG. 3 is a schematic view of the arrangement of the array, and the initial output processing.

FIG. 3 is a partial array layout drawing of a preferred embodiment of the invention. In this drawing, row 1 is opaqued to provide like reference for each column, and the clamp-sample-hold circuitry for initial processing of each column output is also shown.

Figure 4:
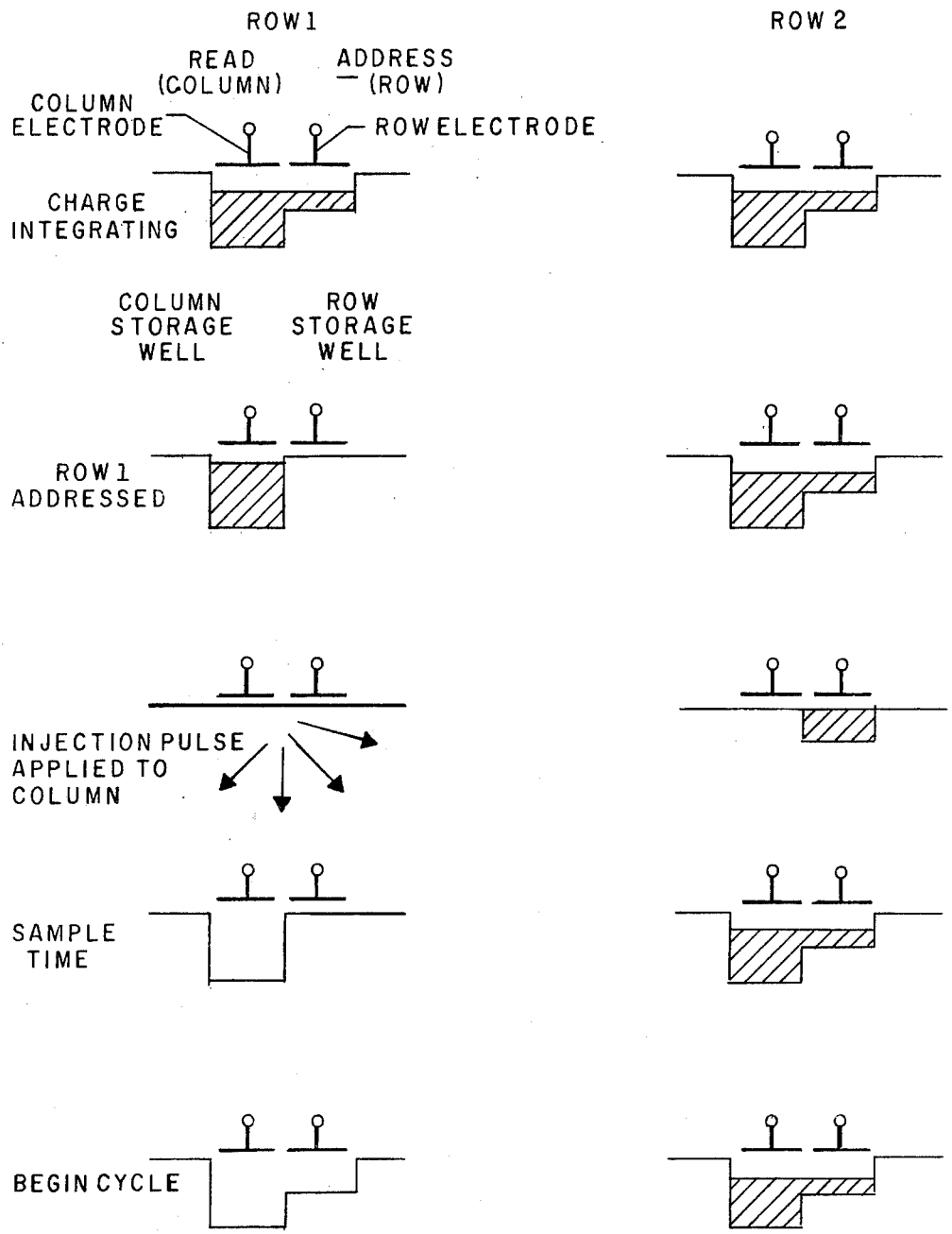
FIG. 4 is a series of schematic cross sections of potential wells in a device, illustrating the electrical operation of each device in the array.

FIG. 4 is a simplified drawing of the electrical operation of two devices in a column of a CID array. The device in row 1 is addressed so that it may be read, while the device in row 2 is typical of other devices in the column which are not being read. Step 1 depicts both devices storing charge, as determined by the level of radiated energy incident upon the device. Step 2 shows the effect of addressing the row 1 device. The row electrode bias is removed, collapsing the row storage well, and moving all charge stored in the device into the column storage well. In step 3, the injection pulse causes the column storage well to be collapsed, the stored charge forced to migrate to the substrate. Note that the device in row 2 also has its column well collapsed, but the charge is transferred to the row storage well. Step 4 shows the restoration of the column well in both devices, and the charge redistributed in the row 2 device. The output of the column in which the addressed device is located is now sampled, and the charge level of the addressed device determined.

The sequence of operations corrects for the blackening problem, which occurs in previous arrays as a result of all the active devices in a column continuing to collect charge, especially between the clamp and sample times. This caused column outputs to be erroneous. The present invention corrects for this effect by referencing each device output to the column output when the blinded row is addressed. In step 5, the storage wells for the row 1 device is restored and charge accummulation begins in the device, and the next device in the column goes through the same process.

Figure 5:
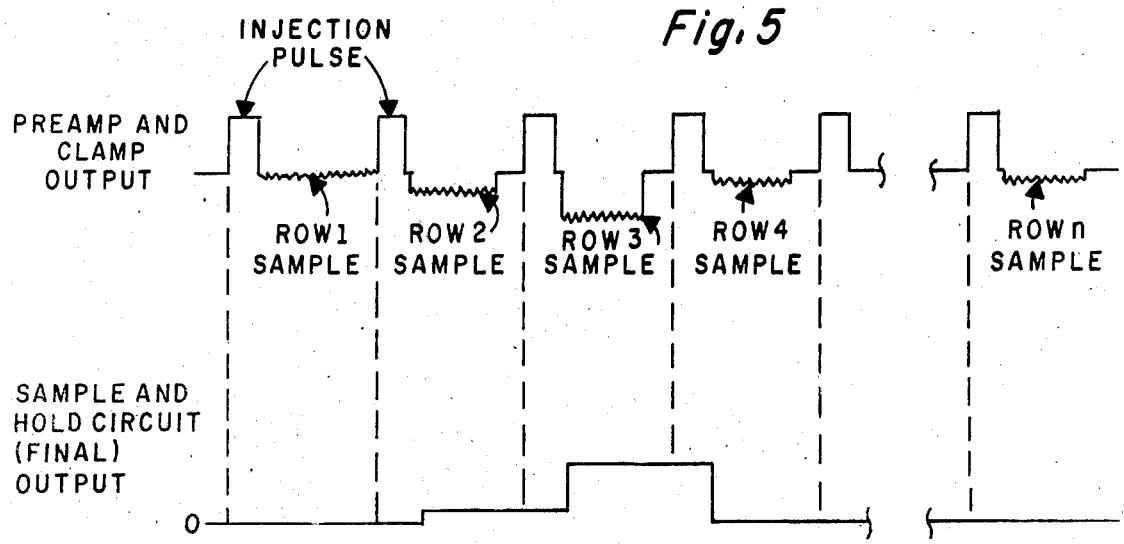
FIG. 5 is a diagram of the output waveform of a typical array column, and the output of the clamp-sample-hold circuit receiving the column output.

FIG. 5 shows the pre-amp and clamp output waveform of a typical array column, and the resultant output of the sample-hold circuit. The output of the column is coupled to a preamplifier and clamp circuit, where the column input is amplified, and the amplified output clamped to a predetermined level at the appropriate time. After the clamp is dropped, the injection pulse is coupled to the column line where the addressed device has its charge injected into the substrate. After the injection pulse has passed, a sample is taken from the preamplifier output which then represents the signal level of the column output minus the effect of the charge which was in the device being read. The sample and hold circuit output is still at the output level of the previous device until a signal allows the output to switch directly to the output level of the current device. This allows a train of output levels to represent the charge levels of the devices in the column, the first output level being the reference level from the opaqued device in row 1 of the column. This string of data is then clamped to the output of the opaqued row by a second clamp circuit. The output of this circuit is now the corrected output.

As shown and described, the present invention proposes a unique solution to the problems of dc offset between columns, blackening, and thermal drift. The problem of dc offset between columns is eliminated by the clamp circuit on the output of each column. The novel solution to the problem of blackening is the "blinding" of one row of devices in the array, preferably row 1. This method of referencing each device output to a common level removes the problem of "blackening", which results of the change in charge on some addressed devices not being seen as correct signal because of change in charge on the other unaddressed devices in the same column. Drifts in column output due to temperature fluctuations should also be minimized, since each device is referenced to the output of a device in the same column.

A preferred embodiment of the invention has been described in detail, but it should be understood that modifications to the invention could be made without departing from the intent and scope of the invention.

What is claimed is:

1. A device for conversion of radiated energy of a predetermined frequency to electrical signals for representation of a real-time image of a scene as portrayed by its radiated energy, comprising:
   an array of charge injection elements having M address rows and N data output columns, having one row of elements optically opaqued;
   means for detecting the charge on each individual element of a column from the column output; and
   means for referencing column output to the output voltage level detected on said opaqued row element of said column.

2. A device as in claim 1, wherein said elements of said array are constructed of silicon and accumulate charge by conversion of reflected energy in the visible light frequency range.

3. A method for reading the charge accumulated within each individual element of a column of devices in a charge injection element array having one row of elements opaqued, comprising:
(a) addressing the row containing said element to be read, by applying a potential to said row;
(b) clamping each output of said column to the voltage level detected on said opaqued row element of said column;
(c) removing said clamp and applying a voltage injection pulse to the column;
(d) sampling said column output after time for recovery from said injection pulse; and
(e) switching said sample of column output to final output.

4. A device for conversion of radiated energy of a predetermined frequency to electrical signals for representation of a real-time image of a scene as portrayed by its radiated energy, comprising:
an array of charge injection elements having M address rows and N data output columns, having one row of elements optically opaqued;
means for detecting the charge on each individual element of a column from the column output; and
means for referencing column output to a fixed level determined by the output voltage level detected on said opaqued row element of said column.

* * * * *